(12) United States Patent
Reinhold et al.

(10) Patent No.: US 6,379,076 B1
(45) Date of Patent: Apr. 30, 2002

(54) STACKABLE, RECESSED, LOCKING, INSULATED THUMBSCREW

(75) Inventors: Steve U. Reinhold, Hillsboro; John S. Lyford, Portland; James H. McGrath, Aloha; Jonathan E. Myers, Portland, all of OR (US)

(73) Assignee: Tektronix, Inc., Beaverton, OR (US)

( * ) Notice: Subject to any disclaimer, the term of this patent is extended or adjusted under 35 U.S.C. 154(b) by 0 days.

(21) Appl. No.: 09/645,771

(22) Filed: Aug. 24, 2000

(51) Int. Cl.[7] ................................................. F16B 21/00
(52) U.S. Cl. ....................................... 403/348; 411/551
(58) Field of Search ................................ 403/348, 349; 411/551, 552

(56) References Cited

U.S. PATENT DOCUMENTS

| | | |
|---|---|---|
| 4,595,251 A | 6/1986 | Moulin |
| 5,716,180 A | * 2/1998 | Bowers ...................... 411/551 |
| 5,851,095 A | * 12/1998 | Ellis et al. ............... 411/552 X |

\* cited by examiner

Primary Examiner—Lynne H. Browne
Assistant Examiner—John R. Cottingham
(74) Attorney, Agent, or Firm—Francis I. Gray

(57) ABSTRACT

A stackable, recessed, locking, insulated thumbscrew for connecting modules together in a stack such that removal of one module from the stack does not loosen other modules in the stack has an insulated knurled cap that fits over the end of a main screw body. The main screw body has an interior threaded end and an exterior threaded end, with the knurled cap slidable over the interior threaded end by means of a bayonet pin on the main screw body and corresponding bayonet slot in the knurled cap. A cap spring is captured between a retainer flange integral with or retainer ring mounted on the interior threaded end adjacent the exterior threaded end and the knurled cap to apply pressure to the knurled cap. In a raised position the knurled cap may be readily grasped for manual screwing and unscrewing of the thumbscrew to add or remove a module from the stack. In a recessed position where the knurled cap is depressed and rotated the knurled cap extends sufficiently so that locking surfaces on the cap engage a locking feature in an upper module so that when the upper module is removed by unscrewing the upper thumbscrew, the lower thumbscrew is restrained from turning, thus keeping the lower module securely fastened in the stack.

10 Claims, 2 Drawing Sheets

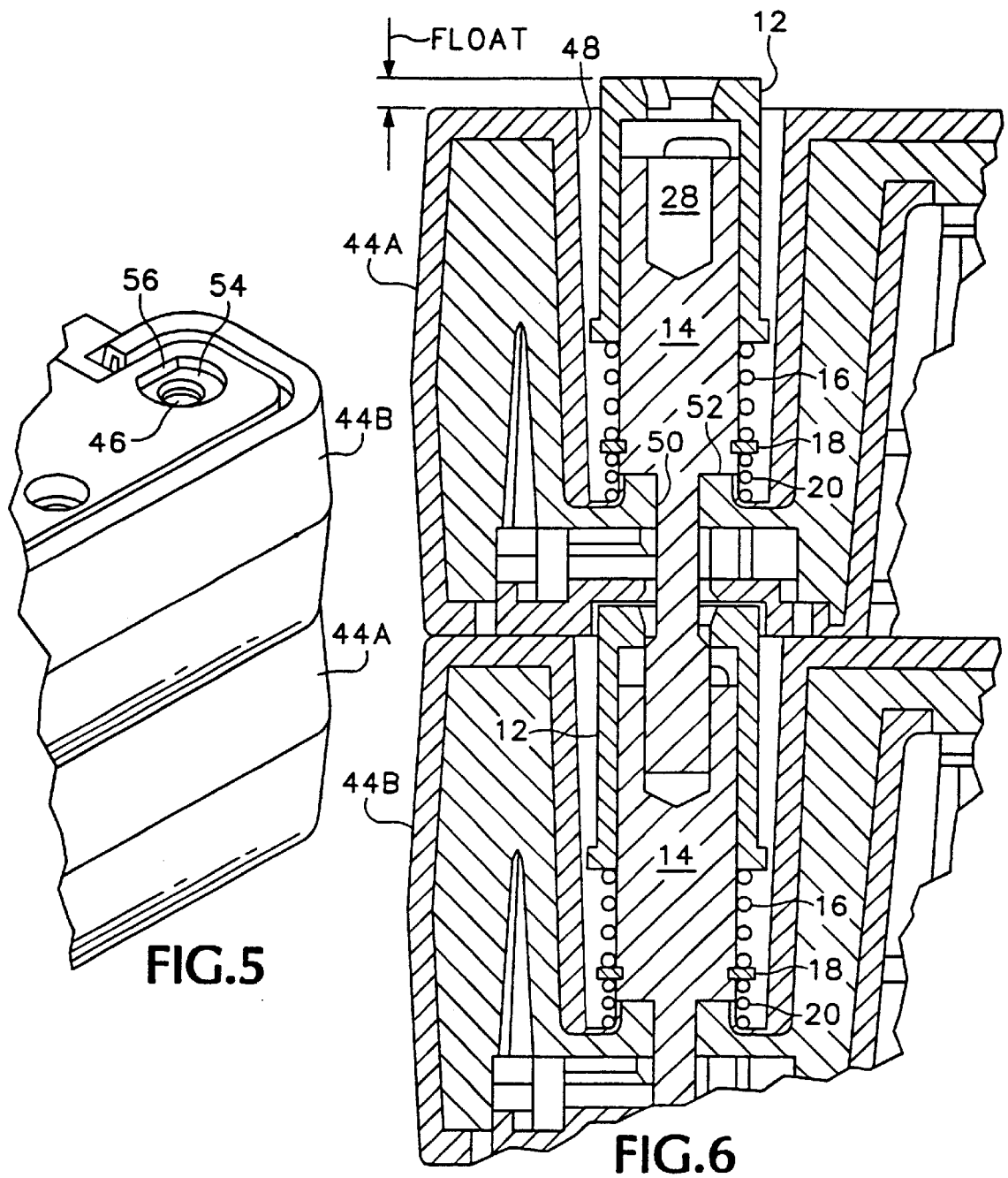

STACKABLE, RECESSED, LOCKING, INSULATED THUMBSCREW

BACKGROUND OF THE INVENTION

The present invention relates to mechanical connections for stackable modules, and more particularly to a stackable, recessed, locking, insulated thumbscrew that allows modules in a stack to be readily removed without affecting underlying modules in the stack.

In a modular product often a plurality of modules are stacked upon each other, with a base module in the stack being mounted on a main frame or platform. The connecting devices used for connecting a lower module to the stack are able to accept connecting devices for the next higher module in the stack. Generally some sort of tool is required to secure the connecting devices into place. In order to have the connecting device be flush with the surface of the module it connects there is a countersunk hole into which the connecting device is recessed when secured. However when a module is removed from the stack, the process of unsecuring the connector devices for the module being removed results in the loosening or unsecuring of the connector devices for the modules lower in the stack. These connecting devices are usually some form of screw mechanism, with a screw driver or the like being the tool required for securing or unsecuring the connecting devices.

First of all it is preferable to be able to secure and unsecure the connecting devices without the use of any tools, as the required tool may become lost or otherwise not be available, especially when in the field. However without a tool it is generally difficult to secure the connecting device in such a way as not to have the connecting devices protruding above the surface of the module being connected, which makes the stack "thicker." Further when removing an upper module from the stack the connecting devices from the lower modules in the stack need to be restrained somehow so that they don't become unsecured.

Therefore what is desired is a stackable, recessed, locking, insulated thumbscrew that may be manually installed and that is locked in place even when the thumbscrew above it in a stack of modules is removed.

BRIEF SUMMARY OF THE INVENTION

Accordingly the present invention provides a stackable, recessed, locking, insulated thumbscrew that has a knurled cap, preferably of an insulated material or coating, which is slidably attached to a main screw body having an externally threaded end and an internally threaded end of the same pitch on a common axis so as to move freely along the common axis. A cap spring mounted on the main screw body urges the knurled cap upwards. The main screw body has bayonet pins that engage "J" shaped bayonet slots in the knurled cap for slidable movement between the two. The knurled cap also has locking surfaces that engage a locking feature in a module higher in the stack so that the thumbscrew is restrained when a thumbscrew for a higher module in the stack is loosened to remove such module. The knurled cap may be easily turned with respect to the screw body by applying finger pressure to the top of the cap and rotating so that the knurled cap "pops up" to be gripped easily for manual tightening or loosening. A coin slot in the knurled cap is provided in the event that mechanical assistance is needed to initially loosen the thumbscrew.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 5 is a partial perspective view of the bottom of a module to be stacked using the stackable, recessed, locking, insulated thumbscrew according to the present invention.

FIG. 6 is a cross-sectional view of stacked modules connected together with the stackable, recessed, locking, insulated thumbscrew according to the present invention.

DETAILED DESCRIPTION OF THE INVENTION

Figure 1:
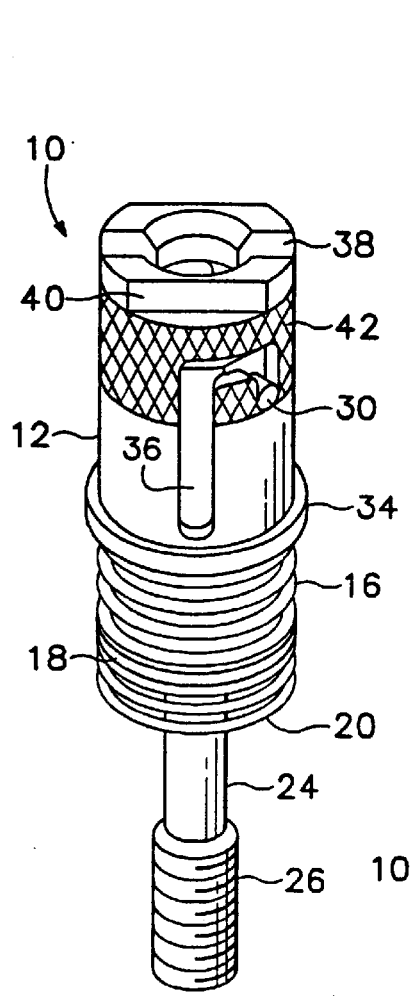
FIG. 1 is a perspective view of a stackable, recessed, locking, insulated thumbscrew according to the present invention.
Figure 2:
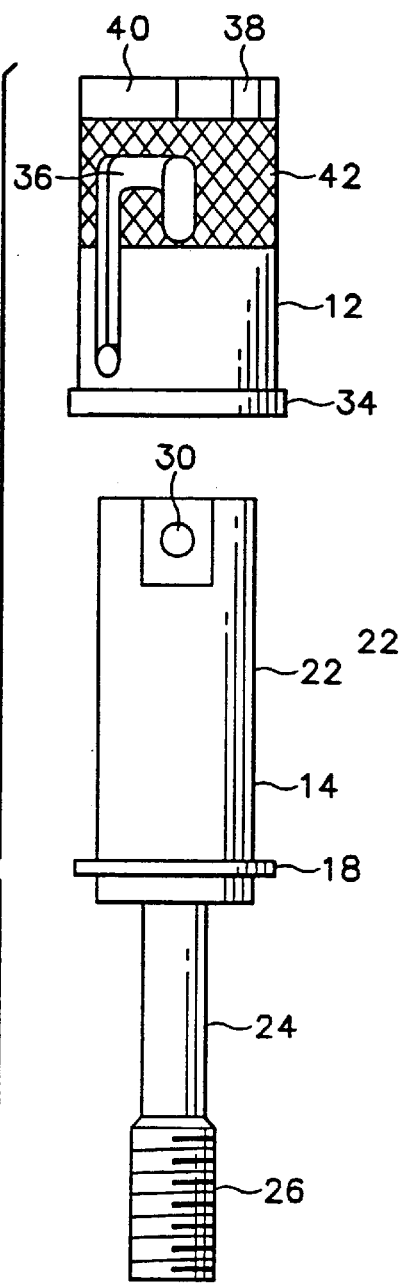
FIG. 2 is an exploded view of the stackable, recessed, locking, insulated thumbscrew according to the present invention.
Figure 3:
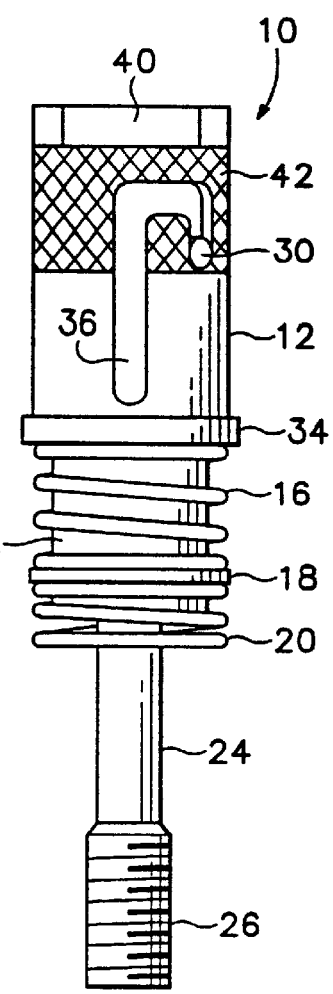
FIG. 3 is a side plan view of the stackable, recessed, locking, insulated thumbscrew according to the present invention.

Referring now to FIGS. 1–4 a stackable, recessed, locking, insulated thumbscrew 10 has a knurled cap 12, a main screw body 14 with a retainer flange 18, a cap spring 16 and a body spring 20. The main screw body 14 has two portions—a main portion 22 having an interior thread 28 axially aligned and integral with a screw portion 24 having an exterior thread 26 of the same pitch. The main portion 22 has a pair of bayonet pins 30 on opposing sides near the end of the main portion opposite the screw portion 24 with the retainer flange 18 being near the end of the main portion adjacent the screw portion. Alternatively around the main portion 22 adjacent the screw potion 24 may be a retaining ring groove in lieu of the retaining flange 18 into which a retaining ring may be fit to serve the same purpose as the retaining flange. The bayonet pins 30 may be press fitted into corresponding holes of the main portion 22 after the knurled cap 12 has been placed over the main screw body 14, or the knurled cap may have an interior groove that allows the cap to slide over the bayonet pins when placed over the main screw body, which groove is subsequently crimped to ensure that the knurled cap and main screw body do not separate.

The knurled cap 12, preferably of an insulative material or coated with an insulative material such as polytetrafluroethylene (PTFE) or a Polane T polyurethane paint, is hollow along the axis of the main screw body 14 and has a flange 34 at one end. A pair of bayonet slots 36 in the form of an inverted "J" extend from the flange 34 upward towards the opposite end of the knurled cap 12. The opposite end of the knurled cap 12 has a coin slot 38 and opposing locking surfaces 40. The region 42 at the end of the knurled cap 12 opposite the flange 34 has light grooves etched into the surface to facilitate manual gripping.

The knurled cap 12 is placed over the main portion 22 of the main screw body 14, as described above, with the bayonet pins 30 being retained in the bayonet slots 36. The cap spring 16 is retained between the flange 34 of the knurled cap 12 and the retainer flange 18. The knurled cap 12 is free to slide up and down on the main portion 22, limited by the bayonet pins 30 in the bayonet slots 36. The knurled cap 12 rests in either a raised position with the bayonet pins 30 at the bottom of the bayonet slots 36 adjacent the flange 34 in the long side of the inverted "J", or in a recessed position with the bayonet pins in the short side of the inverted "J".

Figure 4:
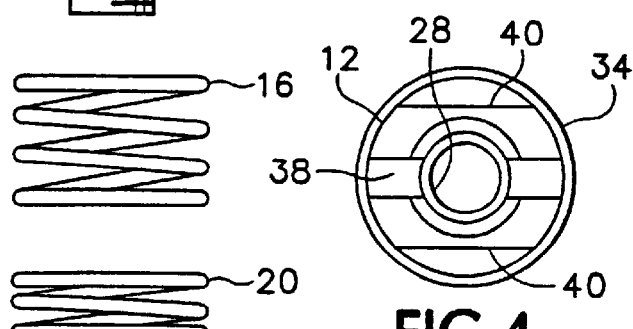
FIG. 4 is a top plan view of the stackable, recessed, locking, insulated thumbscrew according to the present invention.

As shown in FIG. 4 a pair of modules 44A, 44B is shown connected together. A connecting hole 46 through each module allows the thumbscrew 10 to be inserted so that it interconnects with another thumbscrew, or with the platform for a base module, to connect the modules together into a stack. The hole 46 has a wide section 48 and a narrow section 50 forming a shoulder 52. The narrow section 50 has a recessed or countersunk portion 54 at the surface of the module 44 with a locking feature 56 corresponding to the opposing locking surfaces 40 of the knurled cap 12.

In operation the thumbscrew 10 is inserted through the hole 46 in the module 44 so that the threaded end 26 may be manually screwed into a platform—for the base module in a stack—or into the threaded end 28 of another thumbscrew where the module is being added to an already existing stack. The body spring 20 rests against the shoulder 52 in the module hole 46 and supports the main body 22 of the thumbscrew 10. The thumbscrew 10 is tightened manually by gripping the knurled region 42 and rotating it about its axis. The knurled cap 12 is then depressed and rotated so that the bayonet pins 30 are in the short portion of the "J" of the bayonet slots 36—the recessed position. At this time the knurled cap 12 is slightly above the surface of the module 44A as indicated by the float in FIG. 6 and the cap spring is compressed. When an additional module is placed on top of the stack, the float is taken up by the pressure of the additional module until the top of the knurled cap 12 is even with the surface of the module 44A, unless the locking surfaces 40 of the thumbscrew 10 securing the lower module 44B happen to align with the locking feature 54 of the module being added to the stack. To remove the outer module 44A in the stack, the knurled cap 12 is rotated and released so the bayonet pins 30 move from the short to the long side of the "J" of the bayonet slots 36. The cap spring 16 then forces the knurled cap 12 upward above the surface of the module 44A to the raised position where it may be manually grasped by the knurl region 42. If the thumbscrew 10 is stuck, mechanical assist means such as a coin or screwdriver may be inserted into the coin slot 38 to initially loosen the thumbscrew. As the thumbscrew 10 is unscrewed, it may cause the lower thumbscrew for the lower module 44B in the stack to rotate. However within one-half turn the locking surfaces 40 of the knurled cap 12 align with the locking feature 56 of the upper module 44A. At this point the cap spring 16 causes the knurled cap 12 to rise slightly as indicated by the float so that the locking surfaces 40 and feature 54 engage and prevent further rotation of the lower thumbscrew 10. The upper thumbscrew 10 may then be removed easily to remove the upper module 44A from the stack while the lower module 44B remains secured to the stack by the lower thumbscrew.

Thus the present invention provides a stackable, recessed, locking, insulated thumbscrew for securing modules in a stack having a knurled, insulated cap for manual gripping which is slidably mounted on a main screw body, the main screw body having bayonet pins that engage corresponding "J" shaped bayonet slots in the knurled cap and having a cap spring for urging the knurled cap upwards, and the knurled cap having locking surfaces to engage a locking feature in the upper module to restrain its movement when the thumbscrew securing the upper module is removed.

What is claimed is:

1. A thumbscrew for connecting modules in a stack comprising:

a main screw body having an exterior threaded end and an interior threaded end on a common axis, the threaded ends having the same pitch;

a knurled cap attached to encompass the interior threaded end of the main screw body so as to slide along the common axis between a raised position and a recessed position; and a cap spring mounted on the main screw body so as to exert pressure against the knurled cap along the common axis.

2. The thumbscrew as recited in claim 1 further comprising a retaining ring mounted on the interior threaded end of the main screw body so that the cap spring is contained between the retaining ring and the knurled cap.

3. The thumbscrew as recited in claim 1 wherein the main screw body has a bayonet pin at the interior threaded end and the knurled cap has a corresponding bayonet slot situated so that the knurled cap slides along the common axis and rotates about the common axis for movement between the raised and recessed positions.

4. The thumbscrew as recited in claim 1 wherein the knurled cap comprises an insulative material.

5. The thumbscrew as recited in claim 4 wherein the insulative material comprises polytetrafluroethylene.

6. The thumbscrew as recited in claim 1 wherein the knurled cap is coated with an insulative material.

7. The thumbscrew as recited in claim 6 wherein the insulative material comprises a Polane T polyurethane paint.

8. The thumbscrew as recited in claim 6 wherein the insulative material comprises polytetrafluroethylene.

9. The thumbscrew as recited in claim 1 wherein the knurled cap has a head with locking surfaces that correspond to a locking feature in one of the modules above in the stack.

10. The thumbscrew as recited in claim 1 further comprising a retaining flange integral with the interior threaded end of the main screw body so that the cap spring is contained between the retaining flange and the knurled cap.

* * * * *